US010636031B2

(12) United States Patent
Dharmapalan

(10) Patent No.: US 10,636,031 B2
(45) Date of Patent: *Apr. 28, 2020

(54) NETWORKED AUTHENTICATION

(71) Applicant: Tectonics, Grand Cayman (KY)

(72) Inventor: Jonathan Dharmapalan, Oakland, CA (US)

(73) Assignee: TECTONICS, Grand Cayman (KY)

( * ) Notice: Subject to any disclaimer, the term of this patent is extended or adjusted under 35 U.S.C. 154(b) by 448 days.

This patent is subject to a terminal disclaimer.

(21) Appl. No.: 15/378,826

(22) Filed: Dec. 14, 2016

(65) Prior Publication Data

US 2017/0091761 A1 Mar. 30, 2017

Related U.S. Application Data

(63) Continuation of application No. 14/828,875, filed on Aug. 18, 2015, now Pat. No. 9,552,576, which is a
(Continued)

(51) Int. Cl.
*G06Q 20/00* (2012.01)
*G06Q 20/38* (2012.01)
(Continued)

(52) U.S. Cl.
CPC ....... *G06Q 20/381* (2013.01); *G06Q 20/0655* (2013.01); *G06Q 20/08* (2013.01);
(Continued)

(58) Field of Classification Search
None
See application file for complete search history.

(56) References Cited

U.S. PATENT DOCUMENTS

| 9,147,188 B2 * | 9/2015 | Dharmapalan .... G06Q 20/3674 |
| 2001/0007983 A1 * | 7/2001 | Lee ........................ G06Q 20/04 |
| | | 705/69 |

(Continued)

FOREIGN PATENT DOCUMENTS

| JP | 2007241724 A | * | 9/2007 | ............. G06Q 20/00 |
| WO | WO-2009113991 A1 | * | 9/2009 | ............. G06Q 40/00 |

OTHER PUBLICATIONS

Powers, Stephanie. Mobile Money: Using Your Cell Phone to Transfer Funds. (Sep 21, 2010) Retrieved online Dec. 5, 2019. https://www.investopedia.conn/financial-edge/0910/mobile-money-using-your-cell-phone-to-transfer-funds.aspx (Year: 2010).*
(Continued)

*Primary Examiner* — James A Reagan
(74) *Attorney, Agent, or Firm* — DLA Piper LLP (US)

(57) ABSTRACT

Systems and methods here may be used for causing storage of a deposited value in an account of a wireless client associated with the first mobile network in communication with the first mobile network operator. Some embodiments include receiving, a request from the wireless client associated with the first mobile network to send a first value to a wireless client associated to a second mobile network, then checking at the first mobile network operator, if the first subscriber database includes the requested first value associated with the wireless client if the first subscriber database includes at least the requested first value associated with the wireless client associated with the first mobile network, and sending a message indicating the requested first value from the first mobile network operator to a second mobile network operator.

18 Claims, 9 Drawing Sheets

Related U.S. Application Data continuation of application No. 13/030,025, filed on Feb. 17, 2011, now Pat. No. 9,147,188.

(60) Provisional application No. 61/407,010, filed on Oct. 26, 2010.

(51) Int. Cl.
*G06Q 20/32* (2012.01)
*G06Q 20/40* (2012.01)
*G06Q 20/08* (2012.01)
*G06Q 20/06* (2012.01)
*G06Q 20/36* (2012.01)
*H04W 12/06* (2009.01)

(52) U.S. Cl.
CPC ....... *G06Q 20/325* (2013.01); *G06Q 20/3674* (2013.01); *G06Q 20/3678* (2013.01); *G06Q 20/40* (2013.01); *G06Q 20/401* (2013.01); *H04W 12/06* (2013.01)

(56) References Cited

U.S. PATENT DOCUMENTS

| | | | | |
|---|---|---|---|---|
| 2002/0130175 | A1* | 9/2002 | Nakajima | G06Q 20/04 235/379 |
| 2008/0197972 | A1* | 8/2008 | Lawson | G07D 7/0043 340/5.86 |
| 2009/0319425 | A1* | 12/2009 | Tumminaro | G06Q 20/108 705/42 |
| 2010/0274678 | A1* | 10/2010 | Rolf | G06Q 20/04 705/17 |
| 2014/0143142 | A1* | 5/2014 | Talker | G06Q 30/0601 705/41 |

OTHER PUBLICATIONS

Merritt, Cynthia. Mobile Money Transfer Services: The Next Phase in the Evolution in Person-to-Person Payments. (Aug. 2010). Retrieved online Dec. 5, 2019. https://www.frbatlanta.org/-/media/documents/rprf/rprf_resources/wp0810.pdf (Year: 2010).*

* cited by examiner

RETIRMENT REPORT

Serial No: JD1233214510
Denomination: $100.00
Status: Retired
Report Date: February 15, 2011
Depositor ID: 510-343-5500
Deposit Date: January 15, 2010
Issuer: ABC Wireless, Inc.
Withdrawal Date: February 15, 2011
Withdrawer ID: 510-622-0000

NETWORKED AUTHENTICATION

CLAIM OF PRIORITY

This application is a continuation of and claims priority to U.S. patent application Ser. No. 14/828,875 filed 18 Aug. 2015 which is a continuation of Utility patent application Ser. No. 13/030,025 issued as U.S. Pat. No. 9,147,188 filed 17 Feb. 2011 which claims priority from U.S. Provisional Patent Application Ser. No. 61/407,010, filed 26 Oct. 2010, all of which are hereby incorporated by reference in their entireties.

BACKGROUND OF THE INVENTION

The present invention relates generally to computer and communication systems and methods and more specifically to computer and communication systems and methods for issuing, authenticating and tracking electronic money.

Estimated global demand for electronic money continues to increase and is expected to exceed several billion dollars within the next few decades. Here, electronic money or e-money refers to digital currency and electronic payments that exist only in an electronic state.

Mobile device penetration is one reason for this increased electronic money demand. In the underdeveloped world, for example, a majority of the population can access mobile handsets. In fact, such mobile communication devices bridge the financial divide for the so called "unbanked population" without checking accounts by allowing them to use mobile devices to execute monetary transactions. For example, a mobile phone subscriber can prepay for services by depositing cash with an MNO (Mobile Network Operator); and use such credit for payment of purchased goods or services.

Mobile money does constitute pseudo currency that is a substitute for money. For example, a mobile subscriber can use top-up minutes or transfer top-up minutes to another mobile subscriber in exchange for goods and services purchased by the first mobile subscriber.

Such mobile money is, however, proliferating without involvement of central banks. Among other functions, central banks typically issue currency and implement monetary policies as well. Since pseudo currencies are issued by private nonfinancial entities, such pseudo-currencies only work within "closed systems" such as within a mobile network operating system and are not available for use outside of the closed system. Thus, unlike cash issued by the central bank, interoperability is difficult and valuation of such pseudo currencies remains questionable.

Central banks are concerned about consumer protection and are also wary about issuance of electronic money by non-financial institutions due to inadequate capitalization by such institutions, loss of consumer deposits, potential for destabilizing the money supply balance and lack of transparency of electronic payment transactions both for domestic and international cross-border electronic transactions.

Thus, what is needed is a system and method capable of addressing one or more of the aforementioned disadvantages of conventional systems and methods, and the present invention meets this need.

BRIEF SUMMARY OF THE INVENTION

Various aspects of an electronic currency and authentication system and method can be found in exemplary embodiments of the present invention.

In a first embodiment, a method of certifying electronic money corresponding to cash received by the mobile network operator is disclosed. The method involves generating an electronic money validator for certifying electronic money; and attaching the electronic money validator to electronic money originated by a mobile network operator when a cash deposit is received from a mobile subscriber for deposit into the mobile subscriber's account that is administered by the mobile network operator.

Note that the term "cash" refers to cash or cash equivalents. The electronic money validator of the present invention is preferably issued by or under authority of a governing financial institution such as a central bank.

Once the electronic money is withdrawn and converted into cash, the attached electronic money validator is retired and reported to a third-party intermediary server preferably administered by the Central Bank or another appropriate governing authority. Once the electronic money validator is retired, the electronic money ceases to exist.

In this manner, the present invention can formalize a central bank's role for issuing electronic money and for tracking and controlling electronic money issuance. The electronic money and attached validator promotes interoperability as the electronic money and validator are immediately identifiable and can be honored outside the electronic money issuer's network.

Among other advantages, the present invention can also increase consumer protection and increases visibility of electronic money as the Central bank can monitor all both withdrawals emanating from and deposits to the electronic money network. Not only is the present invention applicable to domestic electronic money, the present invention can also function as a governance mechanism for international electronic money for tracking money remittances between countries or different currency regions.

A further understanding of the nature and advantages of the present invention herein may be realized by reference to the remaining portions of the specification and the attached drawings. Further features and advantages of the present invention as well as the structure and operation of various embodiments of the present invention are described in detail below with respect to the accompanying drawings. In the drawings, the same reference numbers indicate identical or functionally similar elements.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail so as to not unnecessarily obscure aspects of the present invention.

Figure 1:
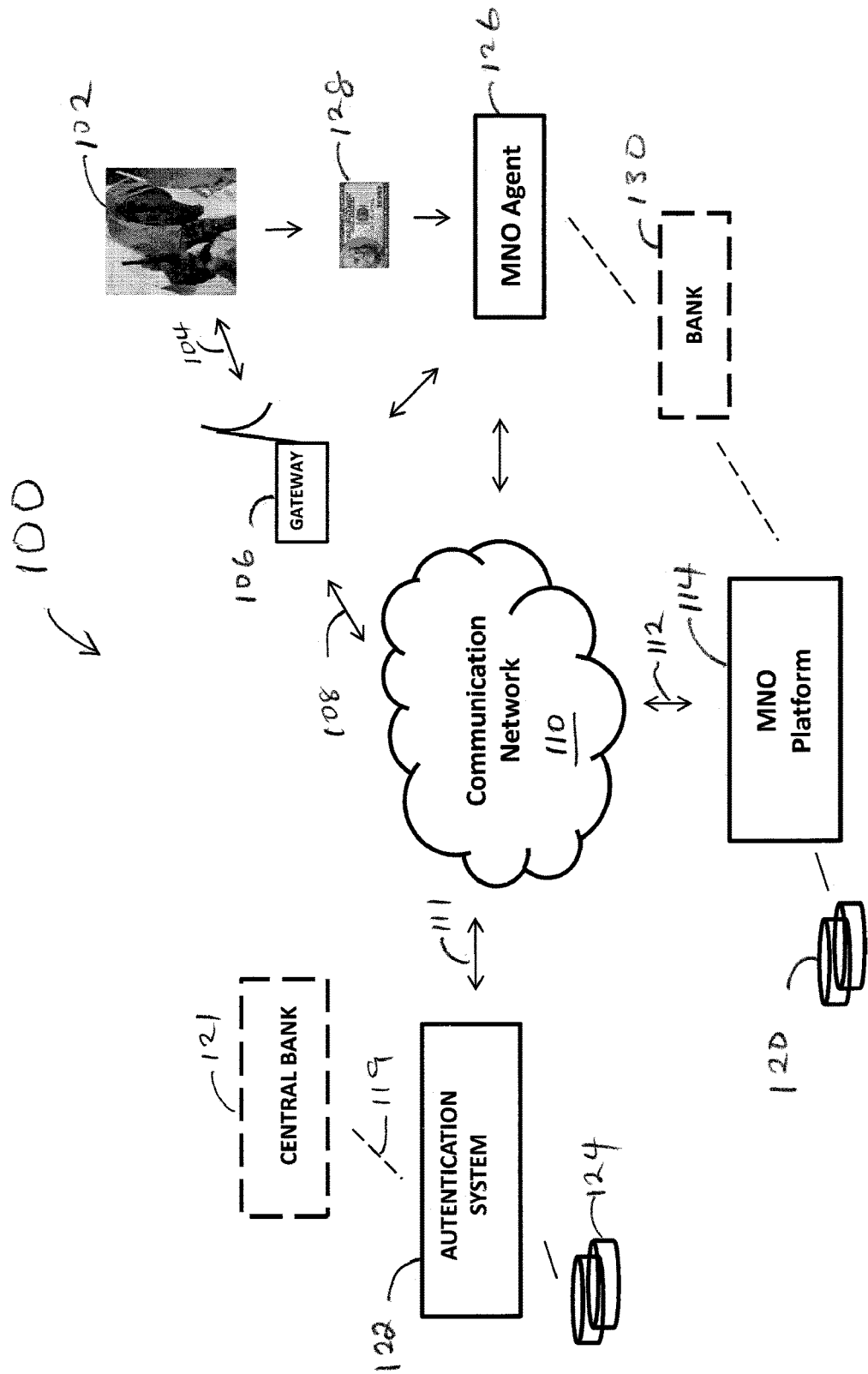
FIG. 1 illustrates an electronic currency system according to an exemplary embodiment of the present invention.

FIG. 1 illustrates electronic currency system 100 according to an exemplary embodiment of the present invention.

In FIG. 1, electronic currency system 100 comprises mobile subscriber 102 communicably coupled to communication network 110 via gateway 106. Communication network 110 can be any wired, wireless, Internet, VPN (Virtual Private Network) and the like capable of transferring data from one point to another.

Gateway 106 is preferably an SMS gateway capable of pushing and pulling text to and from mobile subscriber 102. A communication link 104, preferably wireless, couples mobile subscriber 102 and gateway 106. A communication link 108 communicably couples gateway 106 and communication network 110.

As shown, electronic currency system 100 further comprises MN (Mobile Network Operator) platform 114 communicably connected to communication network 110 via communication link 112. As with the other communication type links, communication link 112 can be wired or wireless.

MNO platform 114 is administered by a mobile operating entity that offers mobile telephone services. Such an MNO might lease or own its own equipment and often provides to users mobile device and corresponding hardware and software that are compatible with the MNO network.

In FIG. 1, electronic currency system 100 further comprises authentication system 122 communicably coupled to communication network 110 via link and to central bank 121 via link 119. Information database 124 stores pertinent information for authentication system 122.

Authentication system 122 issues electronic money validators and certifies electronic monies originated by MNO platform 114 resulting from cash received from its mobile subscribers. Thus, among others, an advantage of the present invention is that financial governing institutions such as central banks can control and track issuance of electronic money and enable effective development of electronic money as a legitimate financial instrument. Authentication system 122 is a third party system independent from MNOs and other electronic money issuers; preferably, authentication system 122 is administered by central bank 121.

In FIG. 1, MNO agent 126 affiliated with the mobile operating entity receives the subscriber cash deposits in collaboration with MNO platform 114. MN O agent 126 is typically an entity or individual located within the coverage area of MNO platform 114 and physically accessible to mobile subscribers. Operation and use of electronic currency system 100 for receiving and certifying mobile subscriber cash or equivalent deposits will now be described below.

Mobile subscriber 102 wishing to utilize electronic currency system 100 begins by approaching MNO agent 126 to deposit cash or cash equivalents. Here, it is assumed that mobile subscriber 102 has active service with MNO platform 114. That is, mobile subscriber 102 has completed preregistration and/or registration routines and has received an appropriate SIM (Subscriber Identification Module) card to enable mobile money services on mobile subscriber 102's handset.

As is typical, mobile subscriber 102 must deposit cash with MNO agent 126 before mobile services from MNO platform 114 can be received. In other words, mobile subscriber 102 must prepay or store value before mobile phone service can be provided by MNO platform 114. As used herein, the term "cash" refers to actual physical currency and equivalents. Cash might also refer to credit or debit cards in certain instances. In exchange, mobile subscriber 102 receives electronic money equivalent to the cash deposit amount.

In FIG. 1, mobile subscriber 102 deposits money 128 with MNO agent 126. The value ascribed to money 128 can be say $100.00. Mobile subscriber 102 also provides the mobile phone number to be associated with and for executing electronic money transactions.

In one embodiment, before cash deposits are accepted, MNO agent 126 verifies its own e-float deposit. Each MNO agent 126 has an established electronic money float or amount that it carries with it at all times. There must be a sufficient amount of e-money float in order for MNO agent 126 to receive cash deposits (and to provide withdrawals as well).

Upon receiving money 128, MNO agent 126 communicates with MNO platform 114 to initiate the process of crediting mobile subscriber 102's account with an equivalent amount of e-money. Here, electronic money or e-money refers to digital currency which only exists in an electronic state and is originated by non-banking institutions. A banking institution primarily functions to accept cash deposits and loan some or all of said cash deposits to other customers. Banking institutions are typically financial and are typically covered by one or more banking regulations.

In FIG. 1, bank 130 is also illustrated for the purpose of storing physical cash deposits received from mobile subscribers by MNO Agent 126. Coordination and tracking of such deposits are cooperatively performed by MNO Agent 126 and bank 130.

Prior to or contemporaneously with crediting mobile subscriber 102's account with electronic money, MNO platform 114 sends in real time an electronic money validator request message asking for an electronic money validator from authentication system 122. As further discussed with reference to FIG. 2A, this electronic money validator is for certifying the electronic money issued by MNO platform 114.

Alternatively, MNO 114 need not request validators in real time when cash deposits are received. Rather, MNO 114 can preorder blocks of electronic money validators in advance for storage on subscriber database 120 for use as cash deposits are received.

After the electronic money validator request is received, authentication system 122 generates and forwards an electronic money validator to MNO platform 114. Upon receipt of the electronic money validator, MNO platform 114 attaches this electronic money validator to the electronic money issued by MNO platform 114.

In one embodiment, preferably, the electronic money and electronic money validator are delivered to subscriber database 120 for storage. In this case, electronic money access data for accessing the electronic money is then forwarded to mobile subscriber 102. Here, note that references to "electronic money" and "electronic money access data" mean one and the same thing.

In an alternate embodiment, the electronic money and the attached electronic money validator are delivered to mobile subscriber 102's handset for storage. In such a case, electronic money access data need not be sent to mobile subscriber 102.

In either case, a record of the electronic money corresponding to money 128 and the electronic money validator equivalent to said electronic money is maintained at all times. In this manner, unlike conventional systems, an electronic money validator is attached and stored with electronic money or corresponding information thereof at all times while the electronic money is within the electronic currency system 100 to facilitate tracking and increase transparency of electronic money circulation. Further use and advantages of the present invention will now be described with reference to FIG. 2A, below.

Figure 2A:
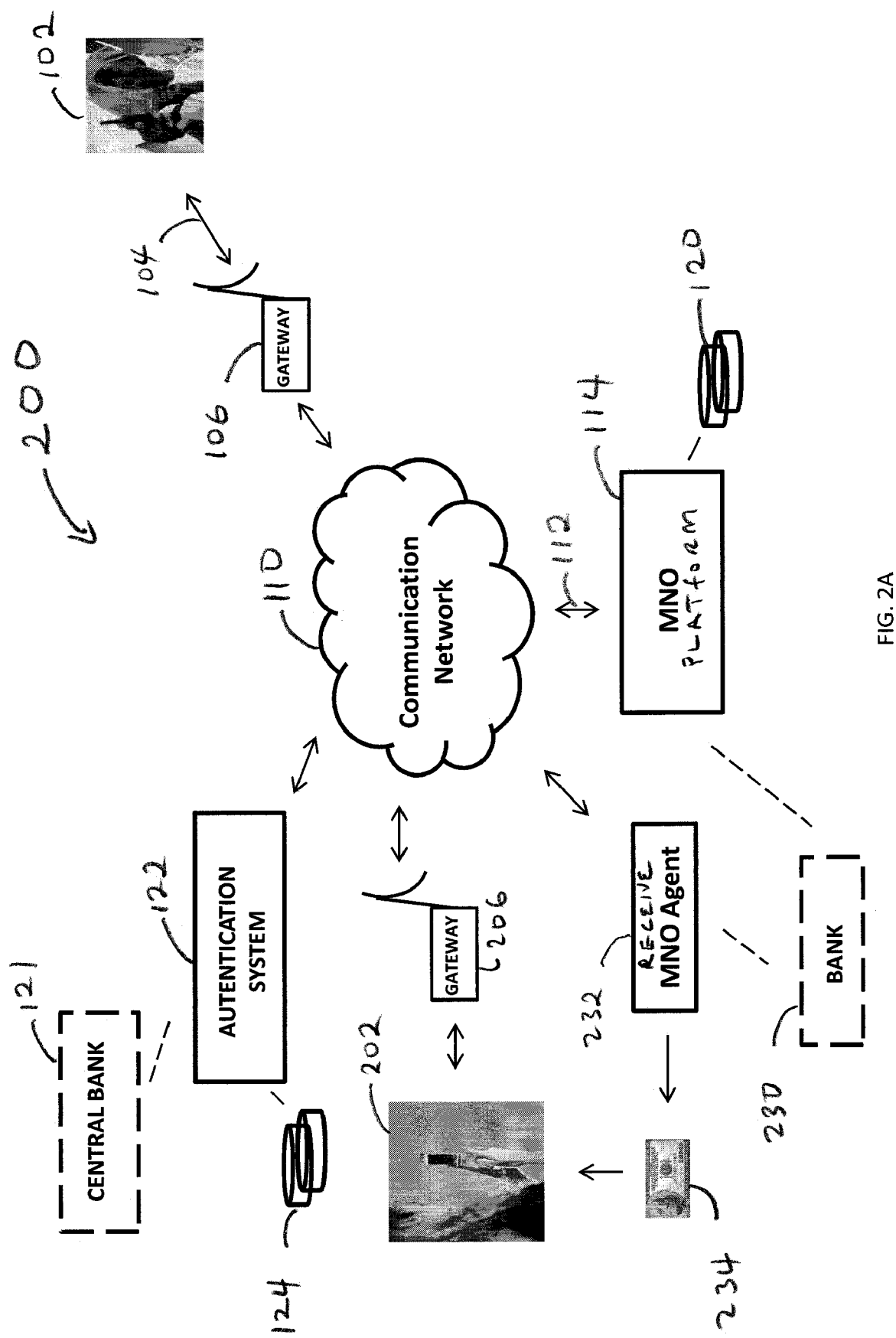
FIG. 2A illustrates an electronic currency system according to an exemplary embodiment of the present invention.

FIG. 2A illustrates electronic currency system 200 according to an exemplary embodiment of the present invention.

In FIG. 2A, electronic currency system 200 comprises mobile subscriber (receiver) 202 communicably coupled to communication network 110 via gateway 206. Gateway 206 is preferably an SMS gateway. Electronic currency system 200 further includes MNO (receive) agent 232 also communicably coupled to MNO platform 114 via communication network 110. All of the other illustrated components are similar to those described with reference to FIG. 1 above.

Referring to FIG. 2A, in use, mobile subscriber (sender) 102 can utilize electronic currency system 200 to remit money to a remotely located receiver 202. In turn, receiver 202 can utilize a mobile device to withdraw the funds transmitted by sender 102. A transactional report for movement of the electronic money and attached validator received by receiver 202 can be generated by authentication system 122.

Specifically, sequence of transmission of money between sender 102 and receiver 202, withdrawal of e-money and transmission of a retirement report to authentication system 122 will now be described with reference to the sequence diagram of FIG. 2B.

Figure 2B:
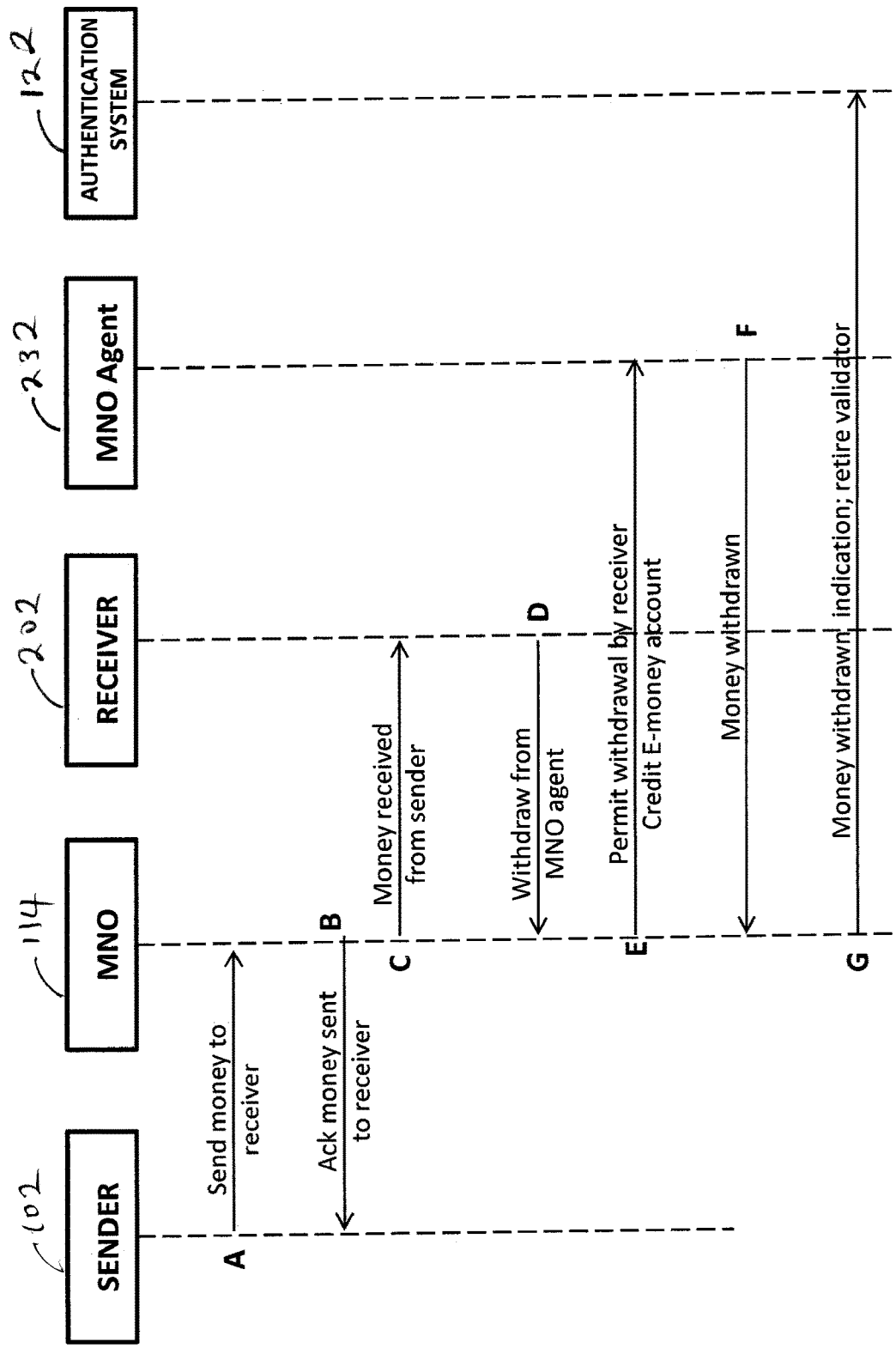
FIG. 2B is a sequence diagram illustrating the sequence of events for FIG. 2A for remitting money from sender to receiver, withdrawing and retiring the withdrawn electronic money.

FIG. 2B is a sequence diagram illustrating the sequence of events for FIG. 2A for remitting money from sender 102 to receiver 202, withdrawing and retiring the withdrawn electronic money.

In FIG. 2B, sender 102 has deposited money with MNO 114 as previously described with reference to FIG. 1. Specifically, sender 102's e-money account has been credited with the deposit amount. In this example, deposit amount can be assumed to be $100. Sender 102's e-money/e-money account also has attached or associated with it an electronic money validator.

Figures 2C, 2D:
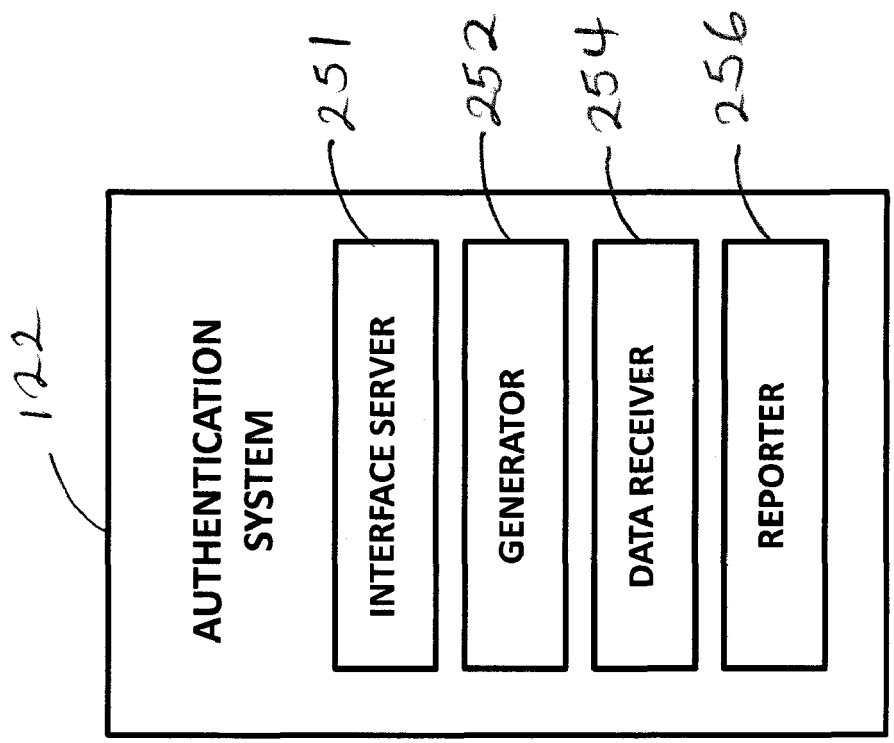
FIG. 2C illustrates components of the authentication system of FIG. 1 according to an exemplary embodiment of the present invention.
FIG. 2D is an example of a retirement report generated by the data reporter of FIG. 2C according to an exemplary embodiment of the present invention.

Electronic money validators are generated by generator 252 of authentication system 122 (FIG. 2C). In this example, an electronic money validator can comprise a 12-digit alphanumeric number not unlike serial numbers employed on physical banknotes. As an example, a serial number might be: JD1233214510; in another example, a serial number can be: JD3211238920.

One skilled in the art will understand that the number of digits utilized or the serial number form can be varied as proves necessary. Thus, for example, an issuing authentication system might employ a 20-digit numeric code such as: 90323498786366637373.

Each serial number is distinct and uniquely authenticates electronic money to which it is attached. As noted, the serial numbers can be any number of digits or alphanumeric number combination commensurate with the amount of e-money needed. Each serial number digit might be storable as a data byte.

In one embodiment, various predetermined denominations are issued by generator 252. For example, issued denominations can be: $10.00; $50.00; $100.00; $250.00; $500.00; and $1000.00.

A denomination is also uniquely identifiable by a particular serial number. For example: Serial No. JD1233214510=$100.00 e-money; Serial No. JD3211238920=$1000.00 e-money.

In this embodiment, no denomination other than the above-referenced is available. In order to represent e-money that has an amount differing from available denominations, a combination of e-money denominations is used. For example, a $150.00 e-money cash deposit can be represented by a combination of the following denominations: $100.00 and $50.00.

In an alternate embodiment, no denominations are issued. Rather, serial numbers are generated for block transactions. For example, cash deposits from five mobile subscribers can be assigned a particular serial number generated by generator 252. Further yet, a serial number (validator) can be generated for the entire amount deposited by sender 102.

Electronic money validators can also contain a unique digital watermark also generated by generator 252 of authentication system 122 of FIG. 2C. This digital watermark comprises a series of data bits embedded into the electronic money data. In such a case, the electronic money is preferably an image viewable by the recipient or authorized parties to the transaction. The digital watermark is insert-able in the electronic money image and can viewed by the receiver to validate the electronic money. Electronic time stamp information might also be included as part of each electronic money validator.

Now referring to FIG. 2B, sender 102 now wishes to remit money ($100) via a mobile device to receiver 202. As shown on the sequence diagram, sender 102 begins by using the mobile device to transmit a "send money to receiver" message to MNO platform 114.

Upon receipt of said message, in one embodiment, MNO platform 114 validates sender 102's credentials and checks sender 102's e-money balance to determine whether the sender's account carries a sufficient balance. In other words, MNO platform 114 examines the e-money and the attached serial number and denomination of the e-money to determine sufficiency for transfer. If all of the required information checks out, MNO platform 114 then credits or transfers the appropriate e-money amount to receiver 102's account.

The e-money, the attached serial number, watermark and/or timestamp previously associated with sender 102 now become associated with receiver 102's account. 10

Thereupon, MNO platform 114 can now respond to sender 102 by sending an acknowledgement and a "money sent to receiver" message as shown at B.

Contemporaneously with the message sent to sender 102, MNO platform 114 also sends a "money received" message to receiver 202. Receiver 202 is now aware that his or her electronic money account has been credited with the funds received from sender 102. Receiver 202 also receives the appropriate access code and information to withdraw or send or transmit the received money as deemed appropriate.

After the "money received" message has been sent to receiver 202, receiver 202 in this case now wishes to withdraw the money in its entirety. Therefore, receiver 202 sends a "withdraw money from MNO agent" message to MNO platform 114 at D. Note that in this case, receiver 202 has specified a particular MNO agent, namely receiver agent 232, from which the money is to be withdrawn.

Upon receipt of the withdraw message from receiver 202, MNO platform 114 validates receiver 202's credentials and ensures that the e-money is available after which MNO platform 114 sends an "allow withdrawal by receiver" message to MNO agent 232 as shown at E.

Thereafter, receiver 202 proceeds to MNO agent 232, withdraws the money from MNO agent 232. MNO agent 232 as shown in FIG. 2A might coordinate with MNO platform 114 to physically withdraw cash from bank 230 in which the original deposit from sender 102 was made.

Referring now to FIG. 2B, after receiver 202 has withdrawn the money, MNO agent 232 sends a "money withdrawn" message to MNO platform 114 as shown at F. In one embodiment, MNO platform 114 also informs authentication system 122 that the electronic money has exited the system as shown at G. This information is an indication to authentication system 122 to retire the associated electronic money validator. In an alternate embodiment, additional information in form of a report might be communicated to authentication system 122. In this manner, statistical information on the movement of electronic money can be gathered as economic data, for example.

Here, note that the electronic money validator is not only taken out of circulation when the money is withdrawn by an authorized representative (receiver 202) of sender 104, the electronic money validator may be retired when a cash deposit is returned to the customer in paper currency form or via a bank account or when the cash deposit is used to purchase a product or service.

Referring now to FIG. 2B, once authentication system 122 receives the exit message, it promptly retires the serial number JD1233214510 and the corresponding denomination $100 from circulation. Note that in one embodiment, each individual transaction is separately reported to authentication system 122. Data reporter 656 of authentication system 122 can then generate a retirement report for forwarding to central bank 121. An example of a retirement report is discussed with reference to FIG. 2D.

In this manner, authentication system 122 can oversee the creation and flow of mobile money in many of its forms. Among other advantages, the system of the present invention eases central bank's discomfort of emerging mobile trends and formalizes the role of the central bank. Consumers, merchants and regulators can utilize the present invention, thus providing essential trust in electronic/mobile money.

Authentication system 122 also gathers data and statistics that give transparency to mobile money. A system can instill confidence and trust for all parties so that private and corporate entities can issue pseudo money without increased cost and maintain their ability to serve the both banked and unbanked population wherein low transaction costs are necessary. The system can be employed as a governing mechanism for electronic money. Prior art systems for governance of electronic money are non-existent. As such, the present invention can assist with the inevitable transition from physical paper banknotes to electronic money.

Note that in the present invention, the electronic money validators can certify money without reference to third-party systems for validation. The present invention can function based on "trust" not unlike physical banknotes that are issued by a central bank. As such, in FIG. 2B, assuming that electronic money and the attached electronic money validator are stored on sender 102's mobile device, sender 102 can directly send the electronic money and validator via MNO 114 to receiver 202.

In that case, receiver 202 receives the money and simply checks (by opening, viewing or otherwise) the electronic money validator to ensure it is issued by authentication system 122. Receiver 202 might be familiar with electronic notes issued by authentication system 122 and upon simply checking by accessing, viewing or otherwise, can determine that the electronic money validator was issued by authentication system 122.

Similarly, if the electronic money and attached electronic money validator resides on MNO 114, sender 102 can direct MNO 114 to send the money to receiver 202. MNO 114 simply retrieves the electronic money and validator from attached subscriber database 120 for forwarding to receiver 202.

FIG. 2C illustrates components of authentication system 122 of FIG. 1 according to an exemplary embodiment of the present invention.

In FIG. 2C, authentication system 122 comprises interface server 251 and generator 252. As implied by its name, interface server 251 interfaces with multiple MNO platforms as well as other electronic money issuers. Generator 252 generates serial numbers that are essentially a certificate of authenticity for attachment to electronic money originated by MNOs and other electronic money issuers.

Data receiver 254 gathers data on the movement of electronic money from MNOs and other electronic money issuers thus monitoring movement of electronic money within the economy. Data reporter 256 interfaces with data receiver 254 to generate data for forwarding to central bank 121. Specifically, data reporter 256 reports on statistically relevant information to central bank and subscribers. An example of data reported by data reporter 256 is the retirement report discussed with reference to FIG. 2D below.

FIG. 2D is an example of a retirement report generated by data reporter 256 according to an exemplary embodiment of the present invention.

Specifically, data reporter 256 interfaces with data receiver 254, which itself receives information from MNOs and other electronic money issuers. The retirement report can be sent to governing institutions such as central bank 121 (FIG. 1).

In FIG. 2D as shown, the title of the report is named "Retirement Report." As shown, the retirement report shows a serial number JD1233214510. This is the serial number attached to the e-money when sender 102's cash deposit was converted to electronic money. Denomination is shown as $100. The status is shown as retired. The report date is shown as Feb. 15, 2012, and depositor I.D. is shown as 5103435500.

A depositor I.D. is preferably the mobile phone number associated with sender 102's mobile device. Deposit date is shown as Jan. 10, 2010. The issuer is shown as ABC Wireless, Inc. The withdrawal date is shown as Feb. 15, 2011, and the withdrawer I.D. is shown as 5103435500. Withdrawer I.D. is preferably a mobile phone number associated with receiver 202's mobile device.

Figure 2E:
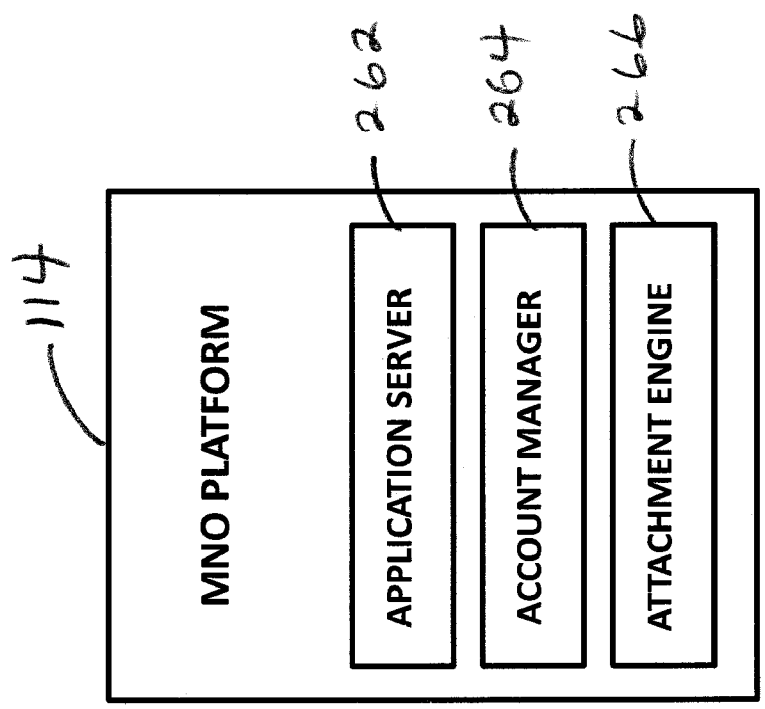
FIG. 2E illustrates components of the MNO platform of FIG. 1 according to an exemplary embodiment of the present invention.

FIG. 2E illustrates components of MNO platform 114 of FIG. 1 according to an exemplary embodiment of the present invention.

In FIG. 2E, MNO platform 114 comprises application server 262 that interfaces with network 110 and conducts front-end processing to communicate messages between mobile subscriber 102 and MNO platform 114 and authentication server 122. Application server 262 might also include core banking applications such as account manager 264 (shown separately).

Account manager 264 manages a plurality of mobile subscriber accounts and interfaces with subscriber database 120 (FIG. 1). MNO platform 114 also comprises attachment engine 266 for electronically attaching/affixing electronic money validators to electronic money. Each of the aforementioned components might comprise computer hardware, software or a combination of both.

Such hardware might be a general purpose computer including one or more processors and said software might comprise logic encoded in one or more tangible media for execution by the one or more processors and when executed operable to implement the present invention. Although not illustrated, other applications or components or configurations consistent with the spirit and scope of the present invention can be utilized.

Figure 3:
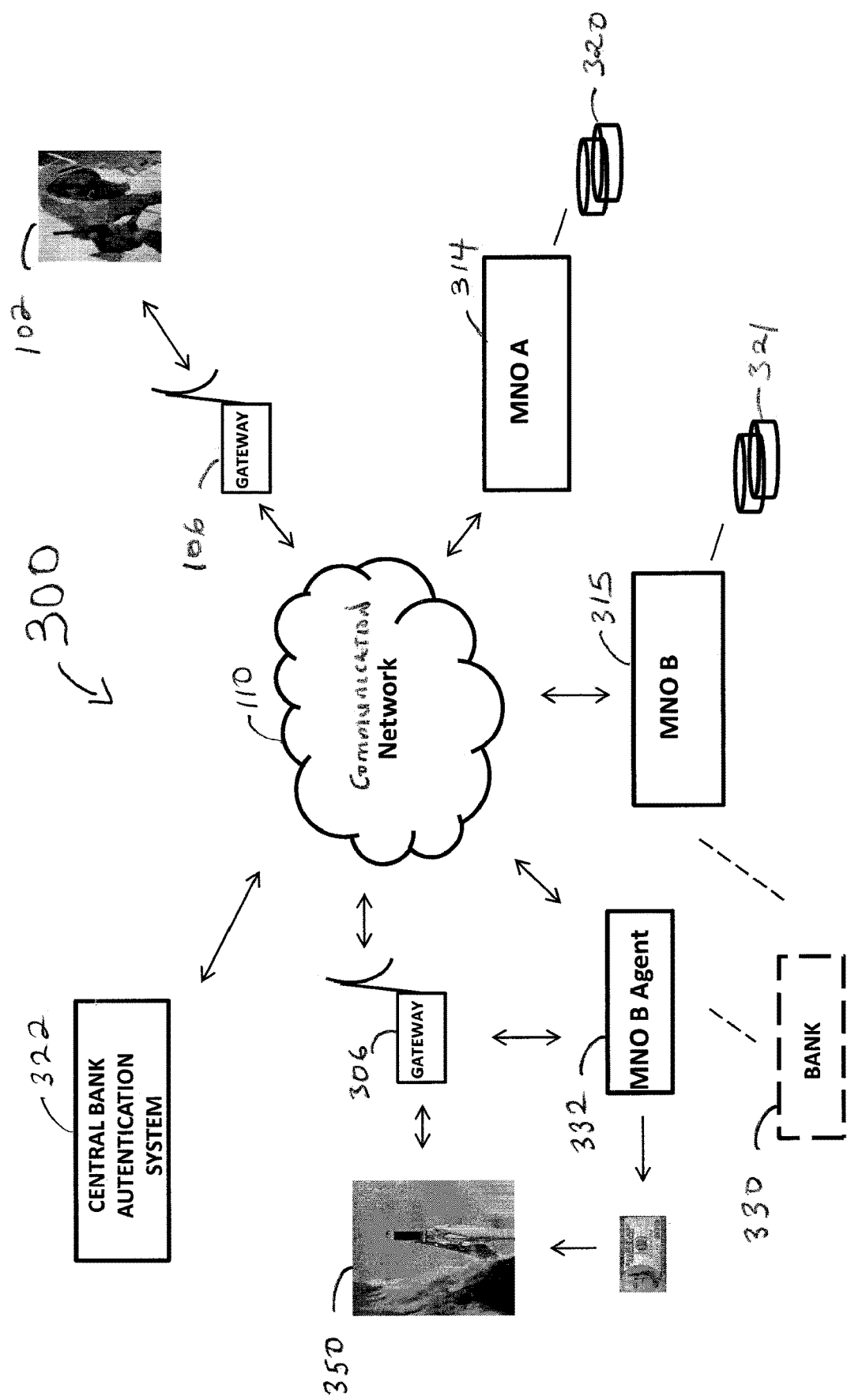
FIG. 3 illustrates an electronic currency system according to another exemplary embodiment of the present invention.

FIG. 3 illustrates electronic currency system 300 according to another exemplary embodiment of the present invention.

In FIG. 3, specifically, user 102 can utilize system 300 to remit money to receiver 350 over two disparate mobile network operator systems. Electronic currency system 300 comprises similar components as those described with reference to FIG. 1; however, electronic currency system 300 includes two separate and distinct mobile network operators namely: MNO A 314 and MNO B 315 within the same geographical or currency region. Further, central bank authentication system 322 is part of and directly administered by an appropriate central bank or other governing party for the region.

Electronic currency system 300 also includes subscriber database 320 attached to MNO A 314, subscriber database 321 associated with MNO B 315, MNO B agent 332 associated with MNO B 315, gateway 306 and bank 330 from which deposit monies can be withdrawn.

In FIG. 3, sender 102 has made a cash deposit (for example, $100) and has been provided corresponding value electronic money as described with reference to FIG. 1. Sender 102's electronic money information is stored in subscriber database 320 of MNO A 314. Sender 102 now wishes to transmit electronic money from MNO A 314 to receiver 350.

Here, the mobile subscriber for MNO B 315 is receiver 350 while that of MNO A 314 is sender 102. That is, sender 102 is not a mobile subscriber of MNO B 315 and receiver 350 is not a subscriber of MNO A 314. As such, any "send and receive request" between sender 102 and receiver 350 must navigate through disparate mobile network operators.

In FIG. 3, to initiate the remittance transfer from sender 102 to receiver 350, sender 102 uses a registered mobile handset to transmit a "send money" message to receiver 350. Specifically, sender 102 transmits to MNO A 314 a message to send money to receiver 350. MNO A 314 receives and validates the request and then checks sender 102's e-money account for sufficiency of funds and upon proper validation transmits a "send money" request to MNO B 315.

Along with the "send money" request, MNO A 314 also sends the e-money, attached serial number, watermark and/or a timestamp. MNO B 315 receives the request, the e-money and the attached serial number and determines the validity of the request. Although the request is received from a separate and distinct MNO, MNO B 315 can validate the request based on the serial number attached to the money and certified by central bank authentication system 322.

Consequently, upon receiving the request, MNO B 315 credits the electronic money account of receiver 350 and subsequently sends a "you've got money" message to receiver 350. Receiver 350 receives the message and sends a request for withdrawal to MNO B 315 with this withdrawal message indicating that receiver 350 wishes to withdraw money from MNO B agent 332.

Second MNO 315 validates the request and sends a confirmation to MNO B agent 332. Receiver 350 can then withdraw the money from MNO B agent 332. MNO B agent 332, in collaboration with MNO B 315 withdraws the physical cash from bank 330. Although not shown, a bank associated with MNO A 314 receives the cash deposited by sender 102. That cash is then subsequently transferred to bank 330 that is associated with MNO B 315.

After receiver 350 receives the money, MNO B agent 332 transmits a "money received" message to MNO B 315. In turn, MNO B 315 transmits a retirement report to central bank authentication system 322 indicating that the money has been withdrawn by receiver 350 and that the electronic money has exited the network.

Central bank authentication system 322 then updates its records and retires the serial number corresponding to the electronic money that was withdrawn. Money deposited at a first mobile network operator can be retrieved or withdrawn at a second disparate mobile network operator. Money deposited at the second disparate mobile network operator can be withdrawn at the first mobile network operator.

Figure 4:
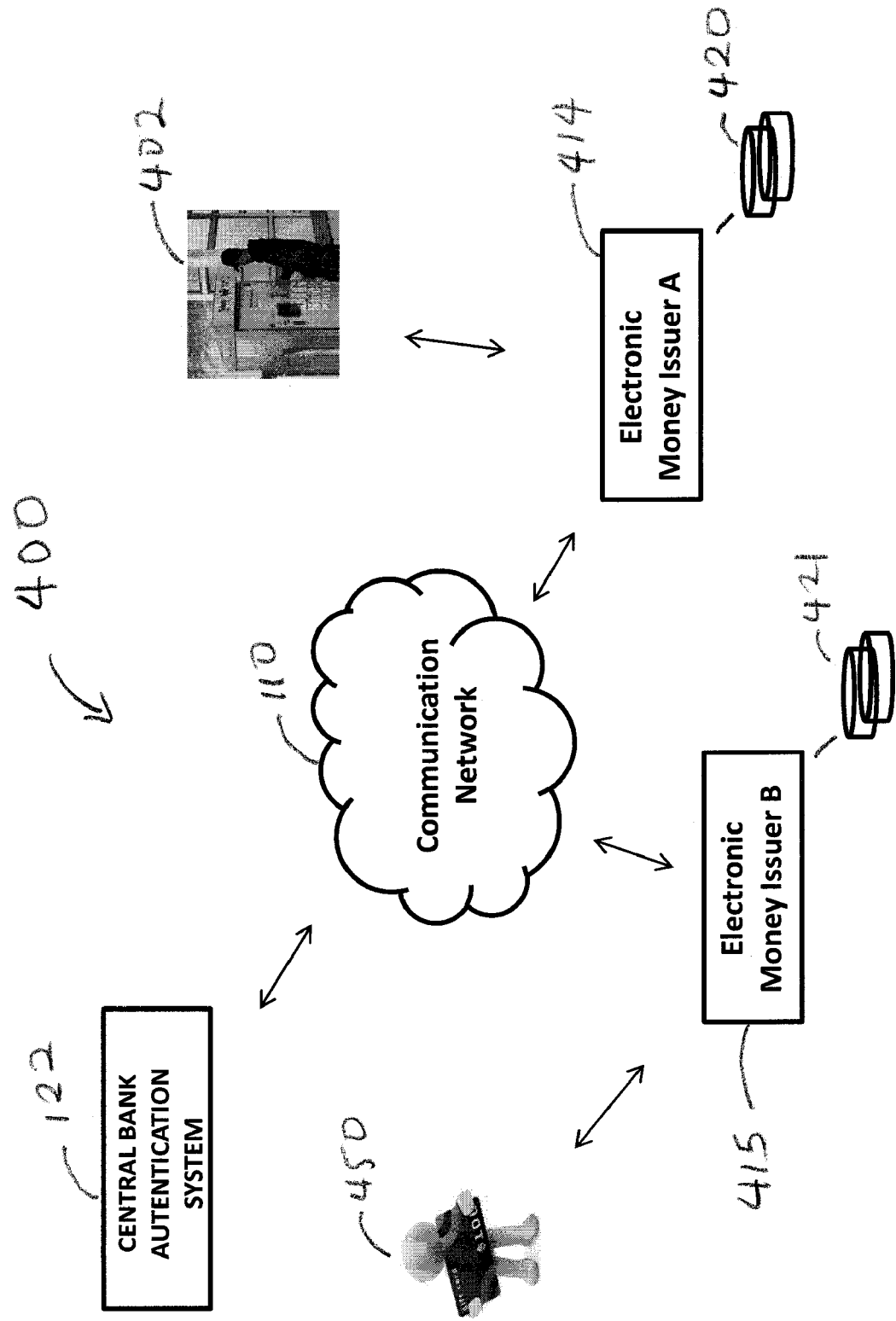
FIG. 4 illustrates an electronic currency system according to an exemplary embodiment of the present invention.

FIG. 4 illustrates electronic currency system 400 according to an exemplary embodiment of the present invention.

In FIG. 4, users can utilize electronic currency system 400 to prepay for products or service, in this case, non-mobile money goods or services. Among other components, electronic currency system 400 comprises user 402 prepaying for services provided by electronic money issuer A 414 (and associated database 420). Here, first electronic money issuer A 414 is a nonbanking entity such as a public transit corporation that offers public transportation to its commuters.

As shown, electronic currency system 400 also includes user 450 prepaying for products provided by electronic money issuer B 415. Both electronic money issuers can generate pseudo currency in the form of pre-paid stored value that can be purchased. Upon depositing cash in a machine provided by electronic money issuer 414, user 402 is provided with a stored value card for electronic money usable for commuting on electronic money issuer A 414 trains and buses.

Similarly, user 305 has purchased a gift card from second electronic money issuer 415. Here, electronic money issuer B 415 is a non-banking entity used by members for sending money or for paying for purchased goods and services. Electronic money issuer B 415 can issue electronic money based on cash or credit/debit card deposits by user 450.

As in previous embodiments, whenever cash or cash equivalent is deposited with either electronic money issuer A 414 or electronic money issuer B 415, an electronic money validator generated by authentication system 122 is attached to the e-money corresponding to electronic money value, and when this electronic money is used for services, a report is sent by the electronic money issuers to authentication system 122 for retirement of the electronic money validator.

Figure 5:
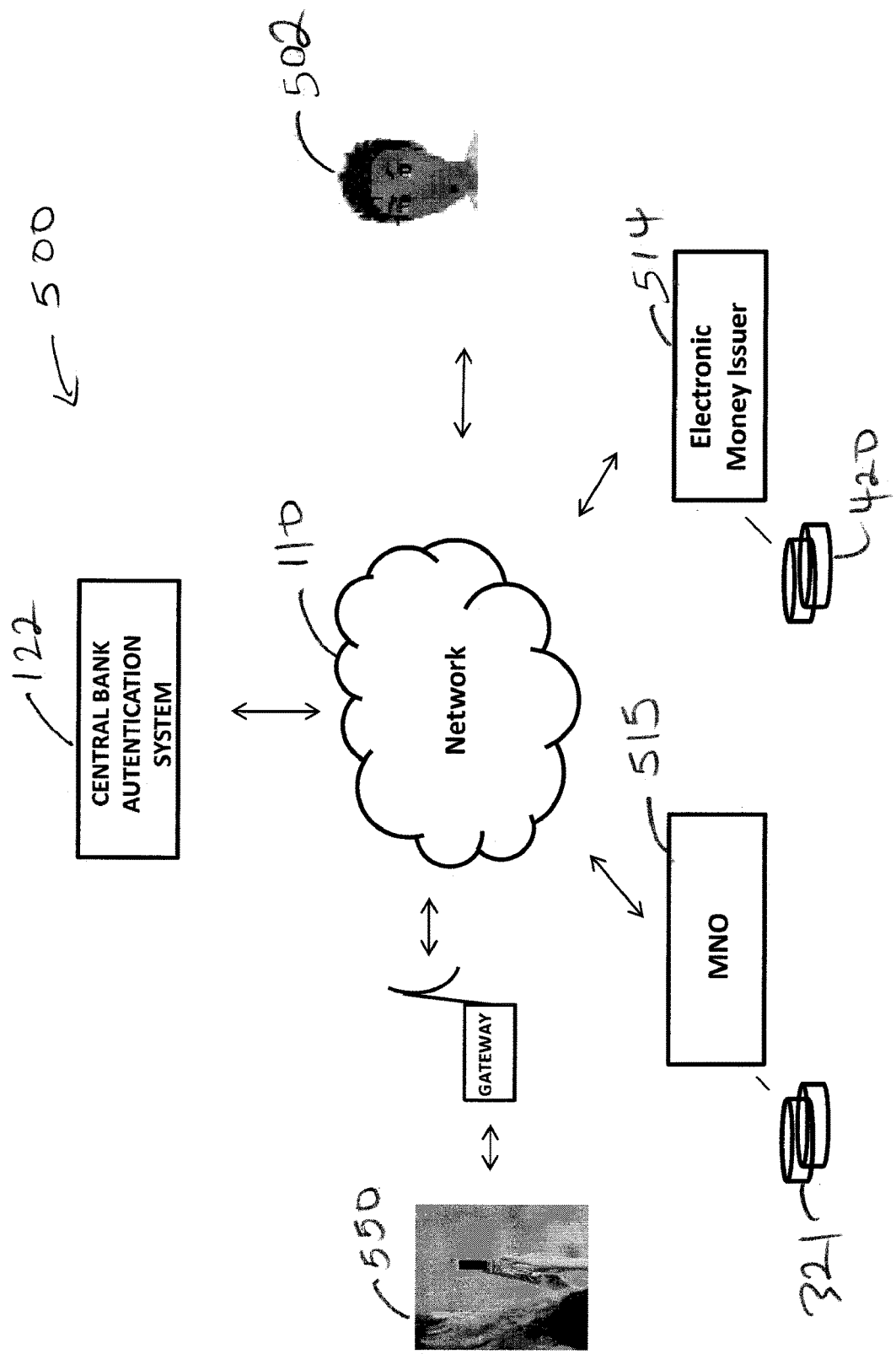
FIG. 5 illustrates an electronic currency system according to an exemplary embodiment of the present invention.

FIG. 5 illustrates electronic currency system 500 according to an exemplary embodiment of the present invention.

In FIG. 5, sender 502 can utilize electronic currency system 500 to remit electronic money to mobile subscriber (receiver) 550. Here, the remittance occurs via electronic money issuer 514 and MNO 515.

Among other components, electronic currency system 500 comprises MNO 515 and electronic money issuer 514 that is preferably a payment service. Such a payment service might establish and maintain online user/payment accounts for its users. The online user accounts are typically tied to the users' bank accounts and/or credit card information.

Here, preliminarily, user 502 must establish an account with electronic money issuer 514. The account establishment process might include user 502 providing his or her bank account information and/or credit card information to electronic money issuer 514. Electronic money issuer 514 receives the financial information, establishes an account (preferably online) and ties the user's financial information (bank account, credit card, etc.) to user 502's online account.

In use, user 502 might wish to remit money to mobile subscriber 550. User 502 begins by transferring money from his or her bank account or credit card on file with electronic money issuer 514. Although not shown, user 502 typically uses a computing device to execute transactions.

Once money is received from user 502, electronic money issuer 514 requests electronic money validators from central bank authentication system 122. Upon receiving the electronic money validators, electronic money issuer 514 creates electronic money and attaches the appropriate validators to the commensurate amount of electronic money for storage in database 420 in user 502's account.

At this point, user 502 can check or view electronic money and attached electronic money validators in his account. User 502 can then use the electronic money and validators for payments, remittances and the like.

Here, user 502 begins the remittance process by directing electronic money issuer 514 to send the electronic money/electronic money validator to mobile subscriber 550 via MNO 515. Electronic money issuer 514 then sends the electronic money/validator to MNO 515.

Electronic money issuer 514 might also inform central bank authentication system 122 that the electronic money/validator has been forwarded to MNO 515. Depending on the embodiment, MNO 515 can retain the electronic money/validator for storage in database 321. In an alternate embodiment, the electronic money/validator can be forwarded to user 550's mobile device for checking and viewing by user 505.

Once user 550 becomes aware that the electronic money/validator has been received, user 550 can use the electronic money/validator for payment of product and/or services. The attached electronic money/validator continues to exist even when transferred to merchants for payment of goods until the electronic money/validator is converted to cash, at which point it ceases to exist in electronic form. Once the electronic money/validator is converted to cash, the transaction is reported to central bank authentication system 122.

Figure 6:
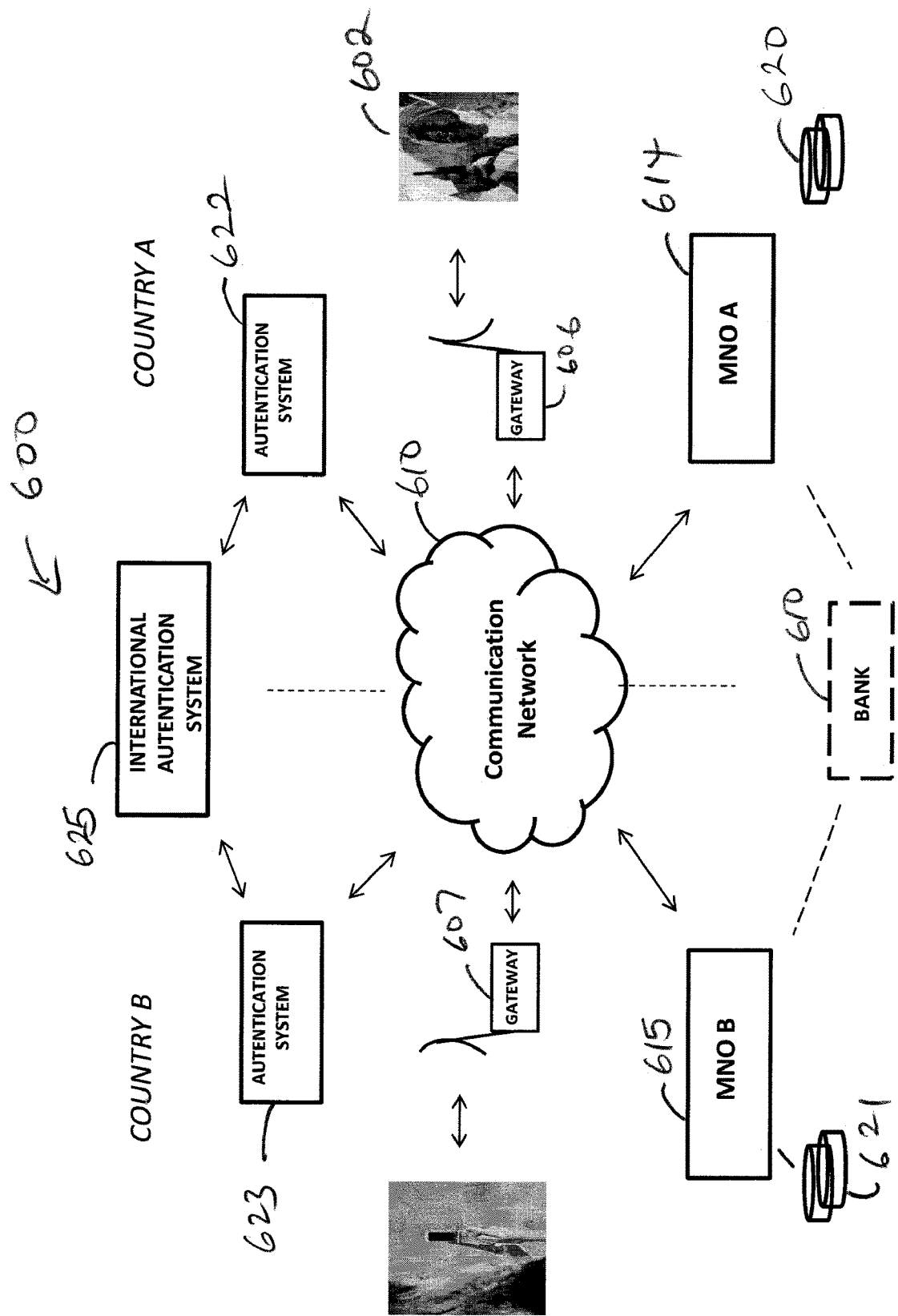
FIG. 6 illustrates an international electronic currency system according to an exemplary embodiment of the present invention.

FIG. 6 illustrates international electronic currency system 600 according to an exemplary embodiment of the present invention.

Specifically, in FIG. 6, electronic money transfer between users in two different countries is shown. Thus, mobile subscriber (sender) 602 of Country A can utilize international electronic currency system 600 to remit funds to user 650 of Country B.

In Country A, international electronic currency system 600 includes authentication system 622, gateway 606, MNO A 614 and subscriber database 620 all which are communicably coupled via communication network 610. Authentication system 622 is preferably administered by a governing central bank of Country A.

Here, sender 602 has previously deposited cash with MNO A 614 and corresponding electronic money value has been generated and saved in database 620. Authentication system 622 then generates electronic money validators attached to and stored with the electronic money value.

In Country B, international electronic currency system 600 comprises mobile subscriber (receiver) 650 communicably coupled to MNO B 615 and its associated database 621 via gateway 607 and communication network 610. Authentication system 623 is also attached to communication network 610. Authentication system 623 (and 622) is preferably administered by a governing body or central bank in Country B.

In FIG. 6, bank 670 facilitates money transfers between Country A and Country B. International electronic currency system 600 also includes an international authentication system 625 that is an overlay between Country A and Country B. Specifically, international authentication system 625 is communicably coupled to authentication system 622 of Country A and to authentication system 623 of Country B. Although not shown, a foreign exchange component is provided for changing a first currency into a second currency based on prevailing foreign exchange market rates.

Transfers originated in Country A and intended for Country B are coordinated via international authentication system 625. Similarly, transfers originated in Country B are also coordinated via international authentication system 625.

As an example, sender 602 might request money remittance or transfer to receiver 650 in Country B. MNO A 614 of Country A receives a request from sender 602, determines that the recipient, receiver 650, is located in Country B and subsequently transfers the electronic money and corresponding access information to MNO B 615 of Country B.

Contemporaneously, MNO A 614 also indicates to authentication system 622 that electronic money has been transferred out of the country. Authentication system 622 in turn retires the serial number but passes the information to international authentication system 625.

International authentication system 625 generates an international serial number corresponding to the electronic money and forwards that international serial number to authentication system 623 of Country B while second MNO B 615 receives the electronic money from MNO A 614. MNO B 615 then reports to authentication system 623 that electronic money has been received.

Authentication system 623 corresponds the electronic money report to that of the international serial number issued by international authentication system 125. At that point, the international serial number is retired while the domestic serial number generated by authentication system 623 is forwarded to MNO B 615 for attachment to the electronic money and for storage in subscriber database 621.

In this manner, each participating Country A and Country B can track the flow of electronic money into and out of its monetary system.

In this manner, the present invention can formalize a central bank's role for issuing electronic money and for tracking and controlling electronic money issuance. The electronic money and attached validator promotes interoperability as the electronic money and validator are immediately identifiable and can be honored outside the electronic money issuer's network. Among other advantages, the present invention is seamless and can increase consumer protection and increases visibility of electronic money as the Central bank can monitor all both deposits into and withdrawals from the electronic money network.

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A computerized method, comprising:
   receiving, at a first mobile network operator server with a processor and memory, an indication of a deposited value over a network from a wireless client associated with a first mobile network;
   causing storage by the first mobile network operator, of the deposited value in an account of the wireless client associated with the first mobile network in a first subscriber database in communication with the first mobile network operator;
   receiving, at the first mobile network operator, a request over a wireless network, from the wireless client associated with the first mobile network, to send a first value to a second wireless client associated with a second mobile network;
   checking, at the first mobile network operator, if the first subscriber database includes the requested first value associated with the wireless client associated with the first mobile network;
   if the first subscriber database includes at least the requested first value associated with the wireless client associated with the first mobile network,
   receiving, by the first mobile network operator, a first validator string for the data associated with the first value, the first validator string having been generated and sent from an independent authentication system;
   appending, by the first mobile network operator, the first validator string to the data associated with the first value; and
   sending a transmission indicating the requested first value, the data associated with the first value, and the appended first validator string from the first mobile network operator to a second mobile network operator with a processor and a memory to credit an account in a second subscriber database associated with the wireless client associated with the second mobile network.

2. The method of claim 1 further comprising,
   validating the request from the wireless client associated with the first mobile network, to send the value to a wireless client associated to a second mobile network before checking if the subscriber database includes the requested value.

3. The method of claim 1 wherein the value includes a serial number.

4. The method of claim 1 wherein the value includes a water mark.

5. The method of claim 1 wherein the value includes a time stamp.

6. The method of claim 1 further comprising,
   changing the credit of an account in the second subscriber database according to a rate of exchange between the first system and the second system.

7. The method of claim 1 wherein the validator strings are from a block of pre-ordered validators from the authentication system, received from the authentication system prior to receiving the request.

8. The method of claim 1 further comprising, sending, by the first mobile network operator, the appended validator strings and data denominations to the requesting wireless handset for storage.

9. The method of claim 1 further comprising,
   receiving, at a second mobile network operator server, a transmission indicating a requested first value and storing the transmission indicating the requested first value in a second subscriber database;
   sending, at the second mobile network operator, a deposit transmission to a wireless client associated with the second mobile network;
   receiving over a wireless network, at the second mobile network operator, a request to withdraw a second value, from the wireless client associated with the second mobile network;
   checking, at the second mobile network operator second subscriber database, an account of the wireless client associated with the second mobile network;
   if the second subscriber database includes at least the requested second value associated with the wireless client associated with the second mobile network, sending, by the second mobile network operator,
   a transmission to a mobile network operator agent to release the second value; and
   a retirement report to an authorization system.

10. A non-transitory computer readable media, with instructions to execute a method, comprising:
    receiving, at a first mobile network operator, an indication of a deposited value over a network from a wireless client associated with a first mobile network;
    storing the deposited value in an account of the wireless client associated with the first mobile network in a first subscriber database in communication with the first mobile network operator;
    receiving over a wireless network, at the first mobile network operator, a request from the wireless client associated with the first mobile network, to send a first value to a wireless client associated to a second mobile network;
    checking, at the first mobile network operator, if the first subscriber database includes the requested first value associated with the wireless client associated with the first mobile network;
    receiving, by the first mobile network operator, a first validator string for the data associated with the first value, the first validator string having been generated and sent from an independent authentication system;
    appending, by the first mobile network operator, the first validator string to the data associated with the first value; and
    if the first subscriber database includes at least the requested first value associated with the wireless client associated with the first mobile network,
    sending a transmission, with the data associated with the first value and the appended validator string, indicating the requested first value from the first mobile network operator to a second mobile network operator to credit an account in a second subscriber database associated with the wireless client associated with the second mobile network.

11. The non-transitory computer readable media of claim 10 further comprising,
validating the request from the wireless client associated with the first mobile network, to send the value to a wireless client associated to a second mobile network before checking if the subscriber database includes the requested value.

12. The non-transitory computer readable media of claim 10 wherein the value includes a serial number.

13. The non-transitory computer readable media of claim 10 wherein the value includes a water mark.

14. The non-transitory computer readable media of claim 10 wherein the value includes a time stamp.

15. A non transitory computer readable media, with instructions to execute a method, comprising: The non-transitory computer readable media of claim 10, further comprising:
receiving, at a second mobile network operator, a message transmission indicating a requested first value and storing the message transmission indicating the requested first value in the second subscriber database;
sending, at the second mobile network operator, a deposit message transmission to a wireless client associated with the second mobile network;
receiving, at the second mobile network operator, a request to withdraw a second value, from the wireless client associated with the second mobile network;
checking, at the second mobile network operator second subscriber database, an account of the wireless client associated with the second mobile network;
receiving, by the first mobile network operator, a first validator string for the data associated with the first value, the first validator string having been generated and sent from an independent authentication system;
appending, by the first mobile network operator, the first validator string to the data associated with the first value; and
if the second subscriber database includes at least the requested second value associated with the wireless client associated with the second mobile network, sending, by the second mobile network operator,
a message transmission with the data associated with the first value and the appended validator string, to a mobile network operator agent to release the second value; and
a retirement report to an authorization system.

16. The non-transitory computer readable media of claim 15, further comprising,
if the second subscriber database includes at least the requested second value associated with the wireless client associated with the second mobile network,
sending, by the second mobile network operator,
a transmission to a mobile network operator agent to release the second value; and
a retirement report including the second value to an authentication system receiving, at the authentication system, the retirement report including the second value from the second mobile network operator;
generating, at the authentication system a data denomination corresponding to the second value;
generating, at the authentication system a first validator string for the second value;
appending, at the authentication system the first validator string to the second value;
sending, at the authentication system the appended first validator string and data denomination to the exchange authentication system via the network; and
retiring, at the authentication system the first validator string when it is sent to the exchange authentication system.

17. The non-transitory computer readable media of claim 16 further comprising,
validating the request from the wireless client associated with the first mobile network, to send the value to a wireless client associated to a second mobile network before checking if the subscriber database includes the requested value.

18. The non-transitory computer readable media of claim 16 wherein, by the authentication system,
changing the second value according to a rate of exchange between the authentication system and a second authentication system.

* * * * *